US009826286B2

(12) United States Patent
Tang et al.

(10) Patent No.: US 9,826,286 B2
(45) Date of Patent: Nov. 21, 2017

(54) VIDEO EDITING METHOD AND TOOL

(71) Applicant: Viacom International Inc., New York, NY (US)

(72) Inventors: Johnson Tang, New York, NY (US); Sam Blake Hofsetter, New York, NY (US); Sarah Epler, Brooklyn, NY (US)

(73) Assignee: VIACOM INTERNATIONAL INC., New York, NY (US)

( * ) Notice: Subject to any disclaimer, the term of this patent is extended or adjusted under 35 U.S.C. 154(b) by 1042 days.

(21) Appl. No.: 13/622,123

(22) Filed: Sep. 18, 2012

(65) Prior Publication Data

US 2014/0079371 A1    Mar. 20, 2014

(51) Int. Cl.
| H04N 9/80 | (2006.01) |
|---|---|
| H04N 21/858 | (2011.01) |
| H04N 21/6587 | (2011.01) |
| H04N 21/2343 | (2011.01) |
| H04N 21/478 | (2011.01) |
| G11B 27/031 | (2006.01) |
| G11B 27/11 | (2006.01) |

(52) U.S. Cl.
CPC ....... *H04N 21/8586* (2013.01); *G11B 27/031* (2013.01); *G11B 27/11* (2013.01); *H04N 21/234345* (2013.01); *H04N 21/478* (2013.01); *H04N 21/6587* (2013.01)

(58) Field of Classification Search
CPC .......... H04N 21/8586; H04N 21/858
USPC ........................................ 386/248
See application file for complete search history.

(56) References Cited

U.S. PATENT DOCUMENTS

| 7,921,449 B2* | 4/2011 | Dunn et al. ............... 725/142 |
|---|---|---|
| 2011/0216224 A1* | 9/2011 | Kim ......................... 348/240.2 |
| 2011/0219413 A1* | 9/2011 | Krikorian et al. ......... 725/109 |
| 2012/0013928 A1* | 1/2012 | Yoshida et al. ............ 358/1.13 |
| 2012/0147269 A1* | 6/2012 | Cho .................... H04N 5/4448 348/552 |
| 2012/0204107 A1* | 8/2012 | Salinas ...................... 715/716 |
| 2013/0218845 A1* | 8/2013 | Kleppner et al. .......... 707/687 |

* cited by examiner

*Primary Examiner* — William Tran
(74) *Attorney, Agent, or Firm* — Fay Kaplun & Marcin, LLP

(57) ABSTRACT

A computer-implemented method is provided for capturing one or more image frames of a real-time streaming video using a wrapper module configured to function with a video player. The wrapper module is in electronic communication with a server. The method includes receiving, by the wrapper module, during streaming of the video by the video player, an indication from a user of a current viewing location in the video to initiate image capturing. The method includes capturing, by the wrapper module, one or more image frames from the video based on the indication of the current viewing location. The method also includes transmitting, by the wrapper module, the one or more captured image frames to the server.

20 Claims, 7 Drawing Sheets

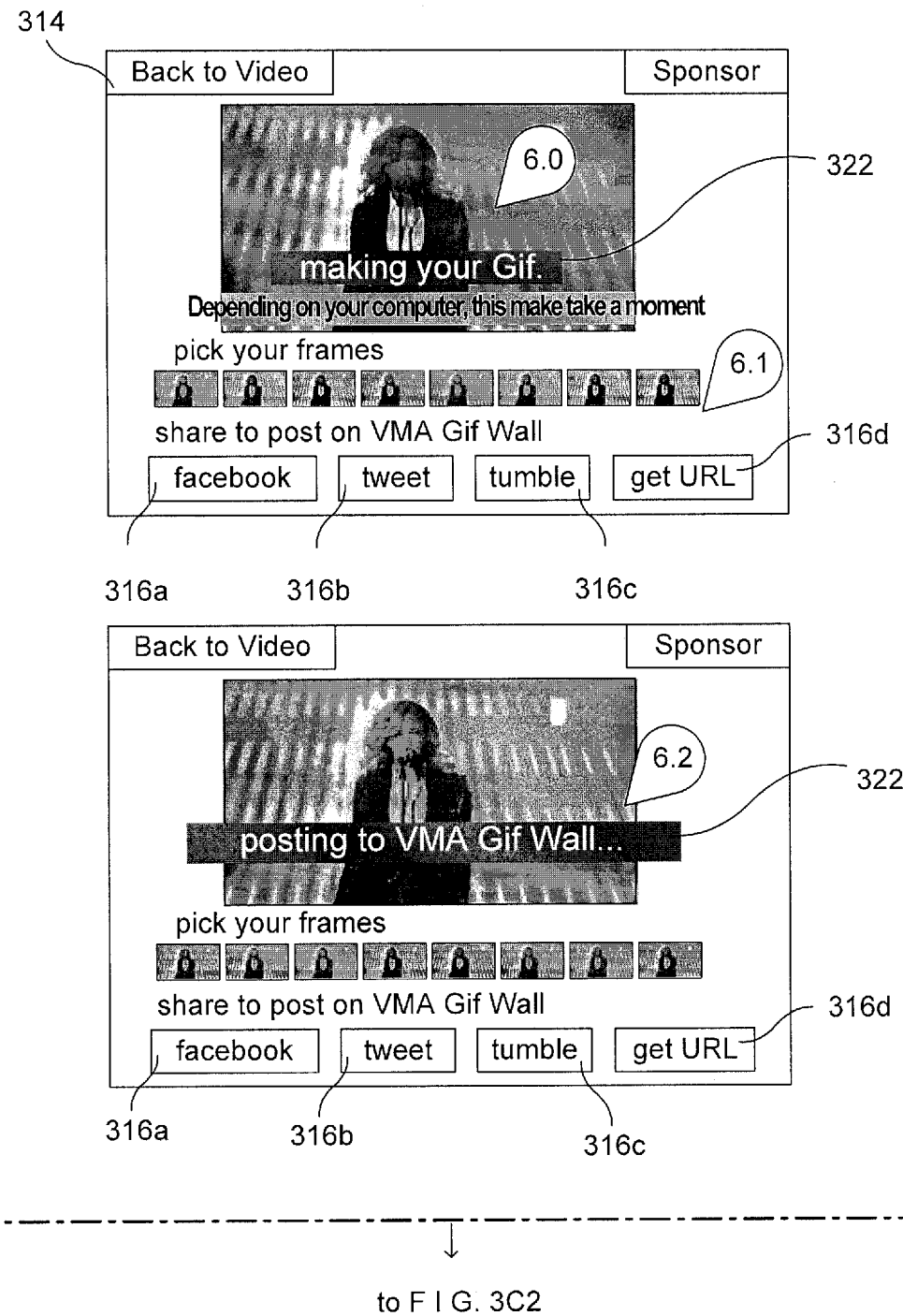
FIG. 3C1

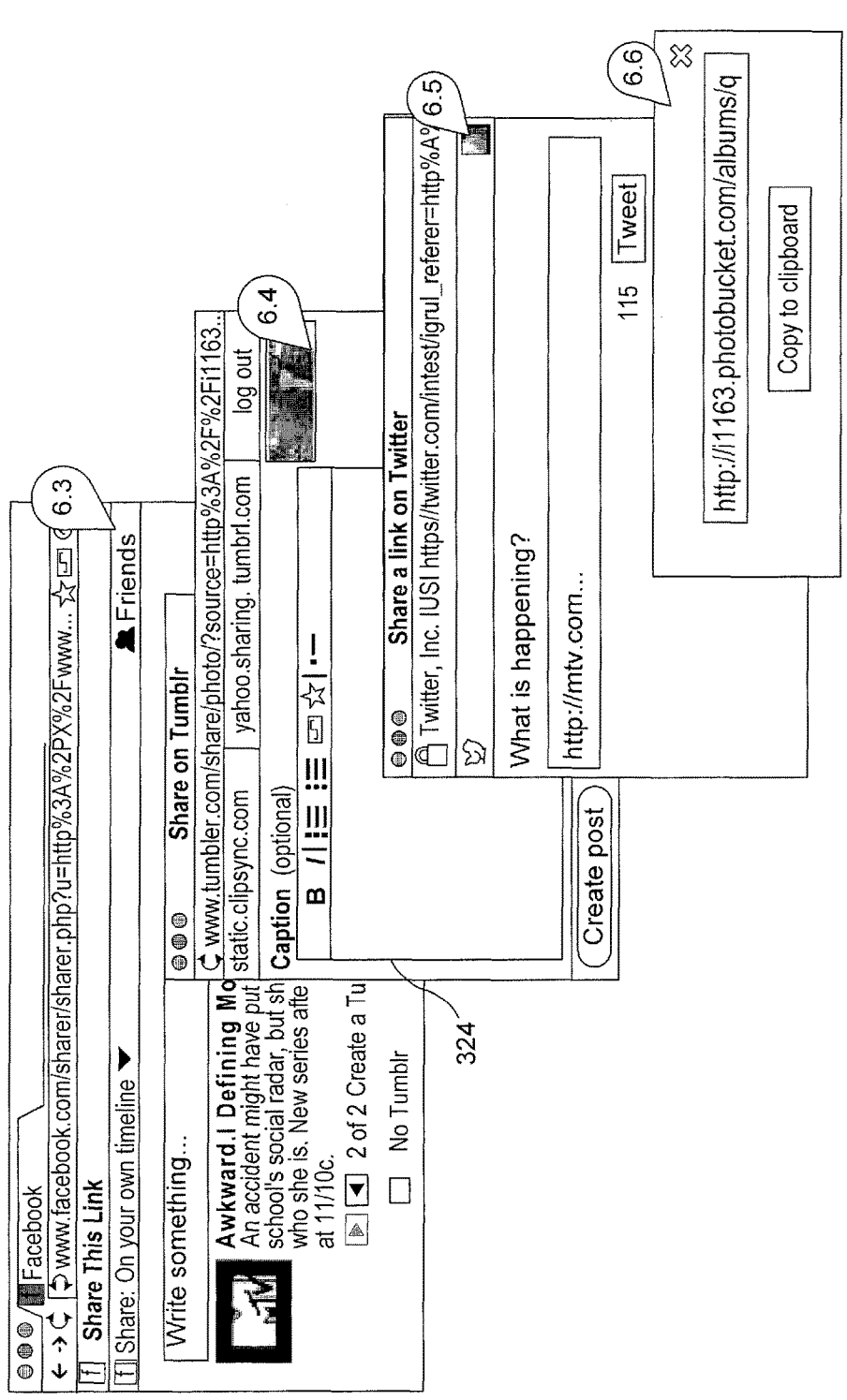
FIG. 3C2

VIDEO EDITING METHOD AND TOOL

FIELD OF THE INVENTION

This invention relates generally to computer-implemented systems and methods for capturing one or more frames of a real-time streaming video.

BACKGROUND OF THE INVENTION

As Internet bandwidth continues to increase, Internet users begin to spend an increasing amount of time watching online videos. These videos may come from any number of sources, including but not limited to, news websites, blogs, video-for-purchase sites, and web aggregators. During video streaming, a user may wish to capture one or more memorable scenes and share them with others. Presently, it is difficult for a user to perform this sharing function as it is not supported by any known video sources. For example, today's users can only share a link to a video and attach an associated textual message indicating the particular scene of interest. This approach is inconvenient since the recipient needs to first read the message to discover which scene he should view and then open the link to the video resource and manually navigate to the appropriate segment of the video to view the suggested scene.

SUMMARY OF THE INVENTION

The present invention recognizes the need for an online method and tool that can conveniently capture and share scenes from a video streamed over the Internet. Instead of being a stand-alone application, the tool can be configured to function with any video player capable of streaming videos of any format.

In one aspect, a computer-implemented method is provided for capturing one or more frames of a real-time streaming video using a wrapper module configured to function with a video player. The wrapper module is in electronic communication with a storage module. The method includes receiving, by the wrapper module, during streaming of the video by the video player, an indication from a user of a current viewing location in the video to initiate frame capturing. The method includes capturing, by the wrapper module, one or more frames from the video based on the indication of the current viewing location. The method also includes transmitting, by the wrapper module, the one or more captured frames to the storage module and causing, by the wrapper module, display of the one or more captured frames.

In another aspect, a wrapper module is provided that is configured to function with a video player and in electrical communication with a storage module. The wrapper module is configured to capture one or more frames of a real-time streaming video presented by the video player. The wrapper module includes a receiving module for receiving, during streaming of the video by the video player, an indication from a user of a current viewing location in the video to initiate frame capturing. The wrapper module includes an extraction module for capturing one or more frames of the video based on the indication of the current viewing location. The wrapper module includes a transmission module for transmitting the one or more captured frames to the storage module. In addition, the wrapper module includes a display module for causing to display the one or more captured frames.

In some embodiments, the wrapper module receives a user selection of one or more frames from the one or more captured frames and creates an animated graphical interchange format (GIF) file based on the selected frames. In some embodiments, the wrapper module stores the animated GIF file in the storage module and creates a Uniform Resource Locator (URL) to identify the location of the animated GIF file in the storage module. In some embodiments, the wrapper module receives a user selection of a sharing option and automatically posts the URL of the animated GIF file at a webpage corresponding to the sharing option. The webpage can be a Facebook page, a Twitter page, a Tumble page or a webpage identified by the URL. In some embodiments, the wrapper module receives a textual message from the user accompanying the animated GIF file and inserts the textual message on the webpage in association with the animated GIF file.

In some embodiments, the storage module resides on a remote server. The wrapper module can be executed on a user device based on applications on the remote server.

In some embodiments, the wrapper module causes the video player to pause presentation of the video after receiving the indication and causes the video player to display the one or more captured frames after the pausing. In some embodiments, the wrapper module permits presentation of the video by the video player without interruption after receiving the indication. The wrapper module can display the one or more captured frames from a second webpage separate from a first webpage from which the video is presented.

In some embodiments, the captured frames include a frame at the current viewing location of the video. The captured frames can also include at least one frame before or after the current viewing location of the video.

In some embodiments, the captured frames can be displayed by the wrapper module as an animated sequence of images in a preview mode.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIGS. 3A-3D show an exemplary sequence of online interfaces for operating the wrapper module.

DETAILED DESCRIPTION OF THE INVENTION

Figure 1:
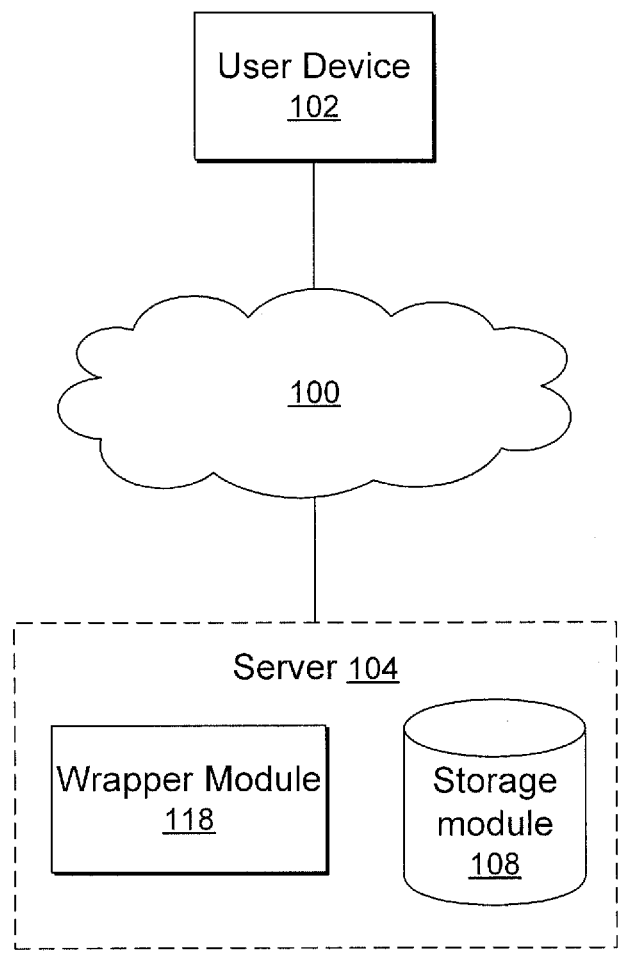
FIG. 1 shows an exemplary network environment according to some embodiments of the present invention.

FIG. 1 shows an exemplary network environment according to some embodiments of the present invention. The network environment includes a user device 102 communicating with a server 104 via an IP network 100. The user device 102 can be a web client capable of displaying web content, including online videos. For example, the user device 102 can play a streaming video with a video player embedded in a web browser. The video can be streamed from a remote host via the video player. In some embodiments, the user device 102 includes a display area for displaying online content and an input means for allowing a user to control online content presentation. The user device 102 can be a home computer or a mobile device, such as an iPad or an iPhone, for example.

In the illustrated embodiment, a wrapper module 118 can be software that is downloaded and executed by the user device 102. The sever 104 can maintain and store the wrapper module 118, which the user device 102 can download prior to playing a streaming video. In some embodiments, the wrapper module can be software, hardware (e.g., user device 102), or a combination of hardware and software. When executing on the user device 102, wrapper module 118 embeds in or "wraps" a video player and the combination is displayed by the user device 102 within a webpage. The wrapper module 118 executing on the user device 102 can capture frames of a video being played by the video player and create an animation based on the captured frames. Details of the wrapper module are described hereinafter. The server 104 also includes a storage module 108 for storing one or more video frames captured by the wrapper module, along with other data related to the captured frames, such as captions, comments, etc. The storage module 108 can also store one or more animation files created by the wrapper module based on the captured video frames. The storage module 108 can further store videos capable of being streamed to the user device 102. Alternatively, the videos can be streamed to the user device 102 from a different server (not shown). In some embodiments, the wrapper module 118 is stored in the storage module 108, from which the wrapper module 118 can be downloaded to the user device 102. In some embodiments, at least a portion of the storage module 108 resides in a location external to the server 104. In some embodiments, the storage module 108 and the wrapper module 118 reside on different servers and are controlled by different entities.

In general, a video includes a sequence of still images (i.e., frames) representing scenes in motion. The wrapper module, once executed on the user device 102, can function with videos of any known format, including, for example, the Audio Video Interleave (AVI) format, the Windows Media (WMV) format, the Moving Pictures Expert Group (MPEG) format, the Flash (Shockwave) format.

Figure 2:
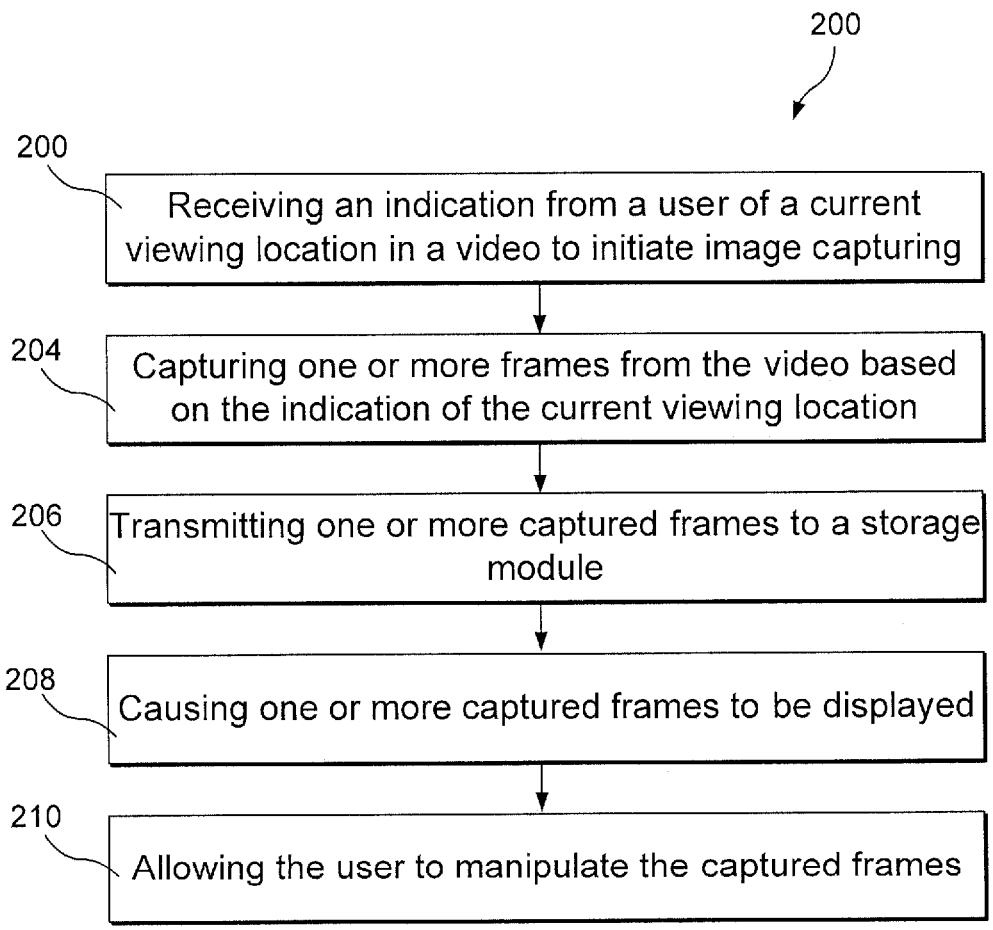
FIG. 2 shows an exemplary process executed by a wrapper module for capturing one or more frames of a real-time streaming video.

FIG. 2 shows an exemplary process 200 executed by a client-side wrapper module via a webpage for capturing one or more frames of a real-time streaming video presented by a video player. During online streaming of the video, a user can interact with the wrapper module, such as clicking a button on the wrapper module, to indicate a current viewing location in the video to perform frame capturing (step 202). In response, the wrapper module extracts one or more frames from the video based on the user indication of the desired location (step 204). When performing frame extraction, the wrapper module can capture a sequence of images corresponding to frames before, after and/or at the viewing position indicated by the user. In some embodiments, the wrapper module only captures the video frame at the desired position indicated. The wrapper module can include transmission means for transmitting the captured images to a remote storage location (step 206), such as to the storage module 108 of FIG. 1.

In addition, the wrapper module can cause a webpage to display at least one of the captured frames (step 208) by initiating a preview mode. In some embodiments, the wrapper module first causes the video player to pause the presentation of the video after receiving the user indication of a desired video location. The wrapper module then automatically initiates the preview mode after the pausing to display the captured video frames and allow the user to manipulate the frames. In some embodiments, the wrapper module, after receiving the user indication, permits the video player to play the video without interruption. The wrapper module only triggers the preview mode after the video is played in its entirety or in a separate webpage so as to not disturb the video streaming. In some embodiments, the wrapper module includes a button, selectable by the user, to manually trigger the preview mode. In the preview mode, the wrapper module can display the captured video frames from the same webpage used to present the video. Alternatively, the wrapper module can display the captured video frames from a different webpage.

By interacting with the wrapper module, a user can manipulate the frames captured by the wrapper module (step 210). For example, the user can choose to store one or more of the captured video frames at, for example, the storage module 108 on the server 104 or at a client-side storage location. The user can also edit the frames such as adding texts on top of the frames and/or resizing the frames. The user can also select a subset or all of the captured video frames to form an animation. The wrapper module can also store the resulting animation file in the storage module 108. The animation file can be in any format, such as in the animated Graphics Interchange Format (GIF). The user can also edit the resulting animation, such as adjusting the speed of the animation and/or looping of the animation. In some embodiments, the wrapper module allows the user to share the animation file with others, such as posting a link to the animation file on one or more social-networking websites or displaying the animation on a designated webpage. In some embodiments, the wrapper module allows the user to add textual messages (e.g., captions and/or comments) to the shared animation file and store the messages in the storage module 108 corresponding to the respective animation files.

In some embodiments, the illustrated steps in the process 200 can be repeated at multiple video locations as the user views the video from a video player. Specifically, a user can interact with the wrapper module to capture video frames at multiple locations of the video. In addition, the wrapper module can display an aggregate of all the captured frames corresponding to the different video locations. The wrapper module can create one or more animations based on a subset or all of the captured frames.

Figure 3A:
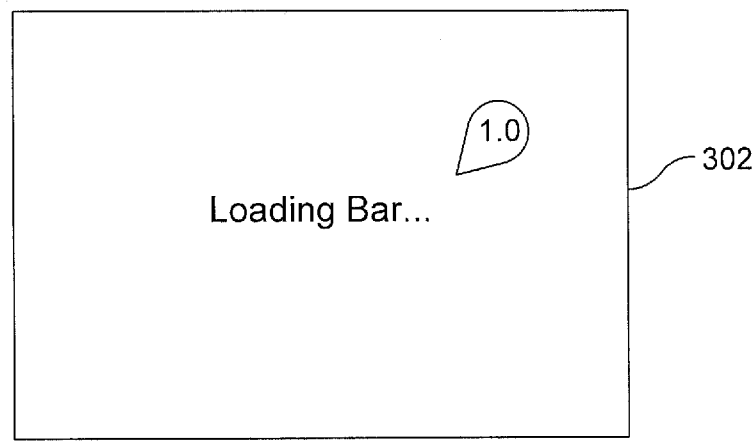
Figure 3A:
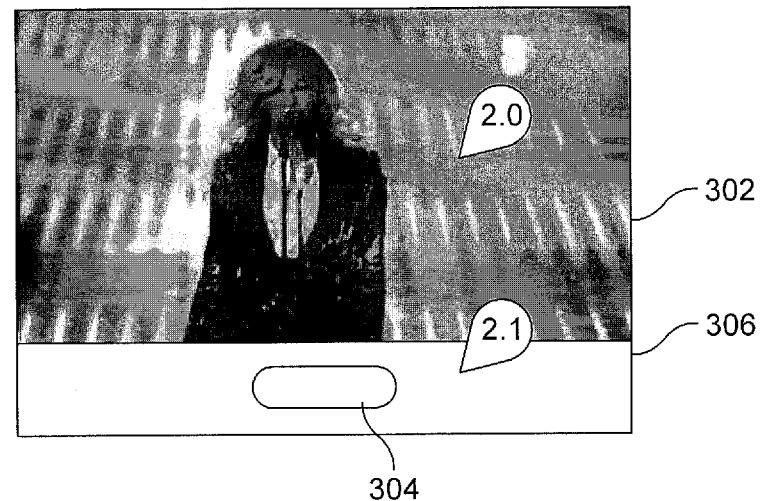
Figure 3A:
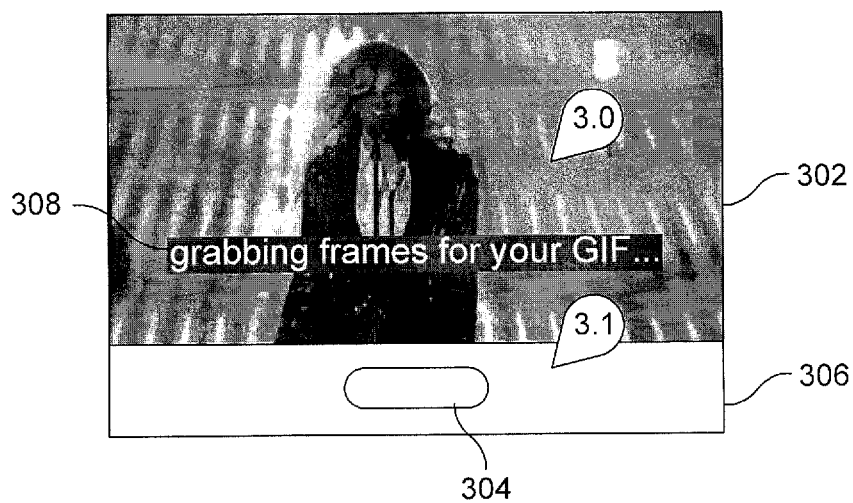

FIGS. 3A-3D show an exemplary sequence of online interfaces for operating a wrapper module. Referring to FIG. 3A, a video player screen 302 is first loaded on a webpage (step 1.0) accessible from a user device, such as the user device 102 of FIG. 1. A user can select a video to be played from the video player screen 302. As the video begins to play (step 2.0), the wrapper module displays a control bar 306 (step 2.1) including a button 304. The button 304 is selectable by the user for marking a current video location and signaling to the wrapper module to start frame capturing. As shown, the control bar 306 is integrated with the video player screen 302. In other embodiments, the control bar 306 is separated from the video player screen 302. A user can click the button 304 (step 3.0), which prompts the wrapper module to display an overlay status message 308 imposed over the video player screen 302, confirming that the user indication has been received and that the wrapper module is extracting the corresponding video frames. In some embodiments, the wrapper module can capture a consecutive number of video frames around the video location indicated by the user. For example, the wrapper module can capture eight video frames over a two-second period around the indicated location. The eight video frames can include images prior to, after and/or at the indicated location. In some embodiments, the wrapper module disables the button 304 and one or more video player controls (step 3.1) while the wrapper module extracts the video frames, but the video can continue to play from the video player screen 302 without interruption. In some embodiments, the video is also paused when the wrapper module performs frame extraction. While this example describes capturing eight frames during a two-second time interval, a person of ordinary skill in the art will understand that any number of frames may be extracted in any time interval.

Figure 3B:
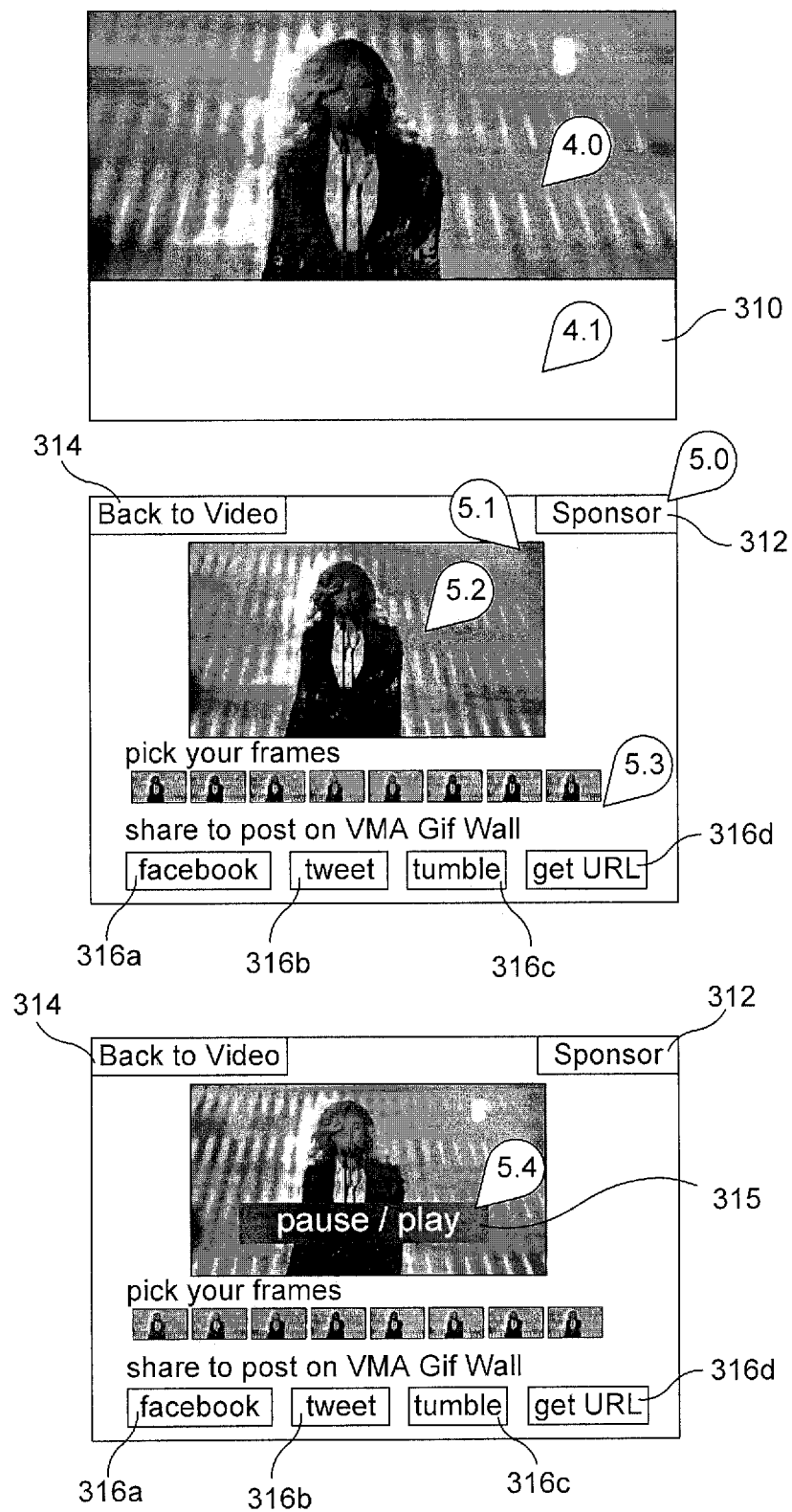

Referring now to FIG. 3B, after the video frames are extracted, the wrapper module initiates a preview mode, during which the video presentation is paused (step 4.0) and a panel 310 appears to replace the control bar 306 (step 4.1). A sponsor overlay 312 can be placed on the video player screen 302 or the panel 310 to serve advertisements to the user (step 5.0). The content of the sponsor overlay 312 can be provided by an online advertisement server different from or the same as the server 104 of FIG. 1. In addition, a logo can be overlaid on the video player screen 302 or the panel 310 to identify the company associated with the wrapper module or the video content (step 5.1). In the preview mode, the wrapper module can display the captured sequence of video frames as an animation clip (i.e., an animated sequence of captured frames) in the video player screen 302 (step 5.2). In some embodiments, the user can determine whether the animated preview is looped. In addition, thumbnail images of the captured video frames can be displayed in the panel 310 (step 5.3). The user can then select or deselect any one of the frames. In some embodiments, selecting or deselecting any one of the frames pauses the presentation of the animation clip in the video player screen 302. In some embodiments, as the user selects or deselects a frame, the content of the animation clip is dynamically updated such that only selected video frames are included in the animation clip and played in the video display screen 302. A visual indicator, such as an "x," may be used to indicate whether a video frame is selected or deselected. In the preview mode, a multifunction button 315 can become visible to the user (step 5.4) as the user places his mouse over the video player screen 302, for example. If the user activates the multifunction button 315 when the animation clip is being played, the playing pauses. If the user selects the multifunction button 315 when the playing is paused, the playing resumes.

In the preview mode, a "Back to Video" button 314 is shown on the video player screen 302 or the panel 310. Upon user selection of the "Back to Video" button 314, the video player screen 302 resumes presentation of the original video at a few frames prior to or after the video location marked by the user to perform frame capturing. In some embodiments, video presentation resumes at the frame corresponding to the indicated video location. In addition, the panel 310 is replaced with the control bar 306 to allow the user to perform frame capturing at other video locations.

Referring now to FIG. 3C, the panel 310 additionally provides sharing functionalities (i.e., sharing icons 316a-d) to allow a user to share the selected video frames as an animation file via one or more social networking sites, image aggregator sites, microblogging or blogging sites, or designated websites identified by unique Uniform Resource Locators (URLs). For example, a user can post a link to the animation file on his Facebook page by activating the Facebook button 316a. A user can tweet a link to the animation file to his Twitter followers by activating the Twitter button 316b. A user can blog about the animation file by activating the Tumble button 316c. In addition, a user can access a webpage to an animation of the selected frames by activating the "get URL" button 316d.

To perform the sharing function, a user can select any of the sharing icons 316a-d (step 6.0). In response, the wrapper module initiates an editing mode. In the editing mode, the wrapper module can pause the animated preview in the video player screen 302 and display a status message 322 to inform the user of the paused status. In response to user selection of a sharing icon, the wrapper module can also create an animation file based on the selected video frames. The animation file can be an animated GIF file. In some embodiments, one or more of the icons and buttons (with the exception of the "Back to Video" button 314) are disabled (step 6.1) while the animation file is being created. When the animation file is ready, the wrapper module updates the status message 322 to reflect the completion of the animation file creation process (step 6.2). In addition, the wrapper module can transmit and store the newly created animation file in the storage module 108 of the server 104, as shown in FIG. 1. Moreover, the wrapper module can create a URL to indicate the location on the server where the newly created animation file can be accessed. The URL is either generated by an Application Programming Interface (API) or constructed based on a predetermined algorithm.

Using the URL, a user can share a link to the animation file via a webpage 324 by choosing any one of the sharing options 316a-d. The webpage 324 can be a Facebook page if the Facebook button 316a is selected. The webpage 324 can be a tweet page if the Tweet button is selected. The webpage 324 can be a tumblr page if the Tumble button 316c is selected. The webpage 324 can be identified by the URL, from which the animation file is loaded and displayed, if the "get URL" button 316D is selected. In some embodiments, a user has the option of entering a textual message (i.e., a caption or comment) into the webpage 324 such that the caption or comment is displayed alongside the link to the animation file.

To complete the sharing process for the first time, a user may need to provide certain account information to link the wrapper module to the user's social-networking accounts. The account information can be saved in the storage module 108. During subsequent sharing operations, the sharing process may be automated such that a desired webpage 324 is automatically loaded by the wrapper module based on the saved user information and the URL of the animation file is pre-populated on the webpage 324. In addition, the user's textual messages can be saved with the appropriate animation file in the storage module 108 such that if the same animation file is used in a different sharing operation, the wrapper module can automatically pre-populate the webpage 324 with the saved messages.

As an example, if the Facebook button 316a is selected by the user, the wrapper module can automatically load the user's Facebook page and pre-populate a posting region of the page with the URL of the animation file (step 6.3), accompanied by a caption or comment. If the user activates the Tumble button 316c, the wrapper module can automatically load the user's Tumblr page and pre-populate the page with the appropriate captions as well as the URL of the animation file (step 6.4). If the user activates the Twitter button 316b, the wrapper module can automatically load the user's Twitter page and pre-populated a posting region with the appropriate hashtag and the URL of the animation file (step 6.5). If the user activates the "get URL" button 316d, the wrapper module can automatically load a webpage identified by the URL, from which the animation file is executed (step 6.6).

Figure 3D:
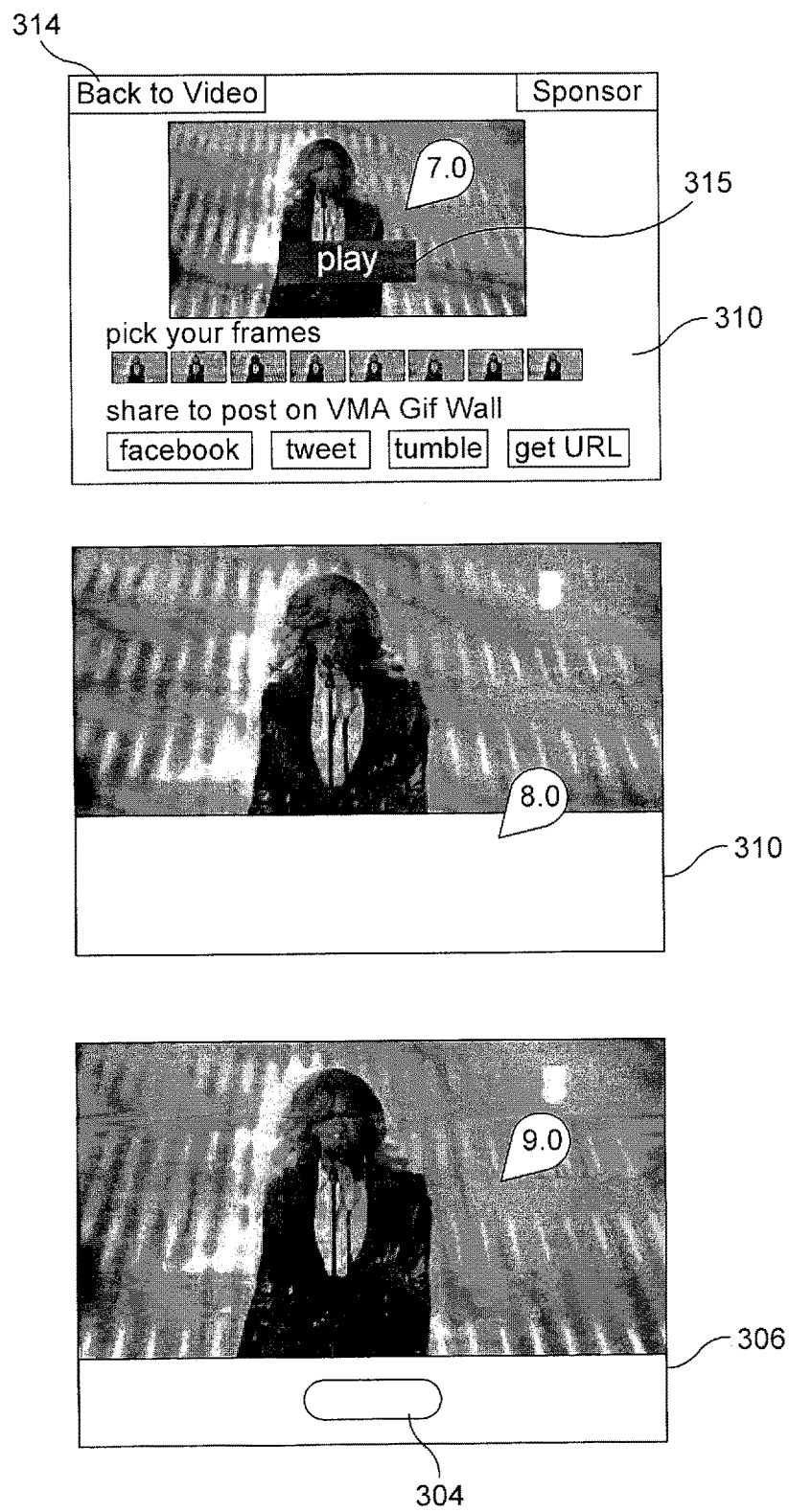

Referring now to FIG. 3D, after completing the sharing process, the user can exit the editing mode and return to the preview mode by activating the multifunction button 315, which resumes the presentation of the animated preview from the video player screen 302. Hence, the user can select another set of captured frames in the panel 310, from which the wrapper module can create and share another animation file. In addition, the user can return to the original video presentation by selecting the "Back to Video" button 314, which causes the panel 310 to disappear (step 8.0), the control bar 306 to reappear (step 9.0), and the video to resume playing. The control bar 306 allows the user to repeat the image capturing process at other desired video locations.

In another embodiment, instead of pausing the streaming video when a user chooses to perform image capturing at a particular video location, as shown in FIG. 3B, the wrapper module can open a new webpage from which all subsequent editing steps are performed, while the original video streaming remains uninterrupted. Alternatively, the wrapper module can initiate the editing mode in the same webpage after the video presentation is completed.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VoIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM)

protocol, a Push-to-Talk (PTT) protocol, a PTT over Cellular (POC) protocol, a Real-time Messaging protocol (RTMP), a Real-time Media Flow Protocol (RTMFP) and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation).

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computer-implemented method for capturing a plurality of frames of a real-time streaming video using a wrapper module configured to function with a video player, the wrapper module being in electronic communication with a storage module, the method comprising:
   receiving, by the wrapper module, during streaming of the video by the video player, an indication from a user of a current viewing location in the video to initiate frame capturing;
   capturing, by the wrapper module, a plurality of frames from the video based on the indication of the current viewing location;
   transmitting, by the wrapper module, the captured frames to the storage module;
   causing, by the wrapper module, display of the captured frames; and
   receiving, by the wrapper module, a user selected subset of the captured frames for manipulation by the user.

2. The computer-implemented method of claim 1, further comprising:
   creating, by the wrapper module, an animated graphical interchange format (GIF) file based on the selected frames.

3. The computer-implemented method of claim 2, further comprising:
   storing, by the wrapper module, the animated GIF file in the storage module; and
   creating, by the wrapper module, a Uniform Resource Locator (URL) identifying the location of the animated GIF file in the storage module.

4. The computer-implemented method of claim 3, further comprising:
   receiving, by the wrapper module, a user selection of a sharing option; and
   automatically posting, by the wrapper module, the URL of the animated GIF file at a webpage corresponding to the sharing option.

5. The computer-implemented method of claim 4, wherein the webpage comprises a Facebook page, a Twitter page, a Tumble page or a webpage identified by the URL.

6. The computer-implemented method of claim 4, further comprising:
   receiving, by the wrapper module, a textual message from the user accompanying the animated GIF file; and
   inserting, by the wrapper module, the textual message on the webpage in association with the animated GIF file.

7. The computer-implemented method of claim 1, wherein the storage module resides on a remote server.

8. The computer-implemented method of claim 7, wherein the wrapper module is executed on a user device based on applications stored in the remote server.

9. The computer-implemented method of claim 1, further comprising:
   pausing, by the wrapper module, presentation of the video after receiving the indication; and
   causing, by the wrapper module, display of the captured frames after the pausing.

10. The computer-implemented method of claim 1, further comprising permitting, by the wrapper module, presentation of the video by the video player without interruption after receiving the indication.

11. The computer-implemented method of claim 1, wherein the captured frames include a frame at the current viewing location of the video.

12. The computer-implemented method of claim 1, wherein the captured frames include at least one frame before or after the current viewing location of the video.

13. The computer-implemented method of claim 1, further comprising causing, by the wrapper module, display of the captured frames from a second webpage separate from a first webpage from which the video is presented.

14. The computer-implemented method of claim 1, wherein the captured frames are displayed as an animated sequence of images in a preview mode.

15. A non-transitory computer readable storage medium with an executable wrapper module stored thereon, the wrapper module configured to function with a video player for capturing a plurality of frames of a real-time streaming video presented by the video player, the wrapper module instructing a microprocessor to perform operations comprising:
   receiving, during streaming of the video by the video player, an indication from a user of a current viewing location in the video to initiate frame capturing;
   capturing a plurality of frames of the video based on the indication of the current viewing location;
   transmitting the captured frames to the storage module;
   causing to display the captured frames; and
   receiving a user selected subset of the captured frames for manipulation by the user.

16. The non-transitory computer readable storage medium of claim 15, wherein the wrapper module instructs the microprocessor to perform operations further comprising creating an animated GIF file based on the subset of the captured frames.

17. The non-transitory computer readable storage medium of claim 16, wherein the animated GIF file is transmitted to a storage module.

18. The non-transitory computer readable storage medium of claim 16, wherein the wrapper module instructs the microprocessor to perform operations further comprising 1) receiving a user selection of a sharing option and 2) automatically posting a URL of the animated GIF file to a webpage associated with the sharing option.

19. The non-transitory computer readable storage medium of claim 15, wherein the captured frames include at least one frame before, after or at the current viewing location of the video.

20. The non-transitory computer readable storage medium of claim 15, further comprising:
   storing the captured frames on a storage module residing on a remote server in electrical communication with the wrapper module.

\* \* \* \* \*